United States Patent [19]

Lauderdale et al.

[11] Patent Number: 5,104,436

[45] Date of Patent: Apr. 14, 1992

[54] METHOD OF PRODUCING GLYOXYLATED HYDROXYPROPYL GUAR AND LIQUID PLANT TREATMENT COMPOSITION CONTAINING SAME

[75] Inventors: Clifton H. Lauderdale, P.O. Box 718, Caldwell, Tex. 77836; Vinai K. Srivastava; Walter H. Carter, both of Dalton, Ga.

[73] Assignees: Colloids, Inc., Dalton, Ga.; Clifton H. Lauderdale, Caldwell, Tex.

[21] Appl. No.: 269,456

[22] Filed: Nov. 9, 1988

[51] Int. Cl.⁵ .................................................. C05G 1/00
[52] U.S. Cl. ..................................... 71/27; 71/64.08; 71/64.09; 71/64.10; 71/904
[58] Field of Search ............... 71/23, 27, 30, 3, 64.08, 71/64.09, 64.10, 904; 106/14.12

[56] References Cited

U.S. PATENT DOCUMENTS

| | | |
|---|---|---|
| 3,105,754 | 10/1963 | Marx . |
| 3,206,297 | 9/1965 | O'Connor . |
| 3,483,121 | 12/1969 | Jordan . |
| 3,519,413 | 7/1970 | Trimbach . |
| 3,649,239 | 3/1972 | Mitchell . |
| 3,740,346 | 6/1973 | Loucheur ................................ 71/28 |
| 3,808,195 | 4/1974 | Shelso et al. . |
| 4,028,127 | 6/1977 | Maske et al. . |
| 4,055,974 | 11/1977 | Jackson, Jr. . |
| 4,241,537 | 12/1980 | Wood . |
| 4,272,414 | 6/1981 | Vandersall . |
| 4,402,725 | 9/1983 | Heller et al. . |
| 4,693,982 | 9/1987 | Carter et al. . |

Primary Examiner—William R. Dixon, Jr.
Assistant Examiner—Paul Marcantoni
Attorney, Agent, or Firm—Shefte, Pinckney & Sawyer

[57] ABSTRACT

A liquid fertilizer composition having a substantial ability to retard leaching of constituent plant nutrients is prepared by dispersing glyoxylated hydroxypropyl guar in an aqueous mixture containing a fertilizer chemical in a preferred concentration of 0.4–1.5% by weight. Similarly, a liquid herbicide, fungicide, insecticide, fire retardant or other liquid plant treatment composition having the ability to adhere to applied surfaces to resist washing is prepared by dispersing glyoxylated hydroxypropyl guar in an aqueous mixture of such a plant treatment chemical in a corresponding concentration. A method is disclosed for producing glyoxylated hydroxypropyl guar by reacting guar gum with propylene oxide and the reaction product thereof with glyoxal in the absence of alcohol or any solvent.

29 Claims, 5 Drawing Sheets

METHOD OF PRODUCING GLYOXYLATED HYDROXYPROPYL GUAR AND LIQUID PLANT TREATMENT COMPOSITION CONTAINING SAME

BACKGROUND OF THE INVENTION

The present invention relates to liquid plant treatment compositions, e.g., fertilizers, herbicides, fungicides, insecticides, and fire retardants, and more particularly to a liquid fertilizer composition containing a dispersion of glyoxylated hydroxypropyl guar. Additionally, the present invention relates to a method of producing glyoxylated hydroxypropyl guar.

In the application of conventional liquid plant treatment compositions, including fertilizers, herbicides, fungicides, insecticides, fire retardants and the like, it is well known that optimal results are obtained by prolonged retention of the treating composition on the plant surfaces or in the soil to which applied. This is particularly true of water soluble inorganic chemical fertilizers which are known to be highly susceptible to rapid and uncontrolled leaching from the soil by surface or rain water. As a result, a significant proportion of the available plant nutrients in the fertilizer often are not absorbed and assimilated by plants growing in the soil.

A relatively significant amount of developmental work has been devoted to attempts to develop fertilizers, plant growth mediums and the like having an ability to retard the release of plant nutrients to improve the degree of nutrient assimilation by plants. Representative examples of varying compositions developed for this purpose are disclosed in U.S. Pat. Nos. 3,105,754; 3,206,297; 3,519,413; 3,649,239; 4,055,974; 4,241,537; and 4,402,725. One commonly proposed technique found in several of these patents is the use of a gelation agent in the fertilizer composition to attempt to retard nutrient leaching. One type of gelling agent utilized in several such fertilizer compositions is a natural vegetable gum such as gum arabic, gum tragacanth, gum karaya, locust bean gum, xanthan gum and guar gum, presumably chosen because of their natural hydrophilic properties and because the plants from which derived can be commercially cultivated.

Unfortunately, however, none of such fertilizer compositions are known to have become commercially accepted and successful. While the reasons for the lack of acceptance and success are not known, it is believed that difficulties may be encountered in the manufacture of such compositions due to the tendency of the gum materials utilized to resist uniform dispersion in liquid suspension, forming cakes or "gumballs". Further, it is believed that the prior fertilizer compositions produced utilizing such gum materials are not of significant effectiveness in retarding leaching of plant nutrients over any extended period of time, which may result from the susceptibility of the gelling agent to microbial degradation when applied to soil.

Another disadvantage of conventional liquid fertilizer compositions is the inability to obtain elevated concentrations of potassium as an available nutrient, commonly referred to as potash. While potassium compounds typically utilized in liquid fertilizers are soluble in water to some degree, it is typically not possible to obtain a concentration of potash in aqueous solution exceeding 9% by weight. To achieve higher potash concentrations, it is conventional to add a clay material to aqueous fertilizer solutions as a suspension agent to hold additional undissolved potash in suspension. This technique, while successful to some extent, has several disadvantages. First, under normal conditions it is still not possible to obtain concentrations of available potash exceeding 12% to 13% by weight. Further, extremely expensive specialized equipment is necessary to prepare the clay suspension and, since clays are generally abrasive in nature, the equipment becomes rapidly worn. Finally, the clay suspension, once prepared, must normally be utilized immediately since the suspension tends to settle out rapidly, within a day or less at relatively cold temperatures.

A further disadvantage of conventional fertilizers is their inability to contain both elemental calcium as a micronutrient and phosphorus-containing compounds due to the normal reactivity of calcium and available phosphorus to form the insoluble salt calcium phosphate which cannot be readily absorbed by plants as a nutrient source.

There accordingly exists a substantial need for liquid plant treatment compositions in general and liquid fertilizer compositions in particular having an ability to resist washing and leaching of the constituent plant treatment chemicals, nutrients and the like. There further exists a need for liquid fertilizer compositions wherein relatively high concentrations of potash may be obtained easily and inexpensively and wherein both elemental calcium and phosphate compounds are held unreacted with one another to be readily available for plant absorption and assimilation.

SUMMARY OF THE INVENTION

It has been discovered that glyoxylated hydroxypropyl guar, produced as a reaction product of a hydroxypropyl ether of guar gum and glyoxal, when dispersed in an aqueous solution or other water-based mixture of such a plant treatment chemical, acts as a suspension agent and protective colloid to provide remarkably and unexpectedly better results in retarding leaching and resisting washing of the plant treatment chemical than can be achieved using natural guar flour or substantially any other derivative guar compound.

In its various possible applications with differing types of plant treatment chemicals, the glyoxylated hydroxypropyl guar may be dispersed in the aqueous mixture of the plant treatment chemical in various possible concentrations which may range broadly from about 0.25% to about 10.0% by weight of the total weight of the mixture. As preferably embodied in a water-based liquid fertilizer composition, the glyoxylated hydroxypropyl guar is most desirably present in a sufficient concentration to have an affinity to retain additional water by hydration, which typically is provided at concentrations from about 0.25% to about 5.0% and, most preferably, between about 0.4% and about 1.5% by weight.

The hydroxypropyl ether of guar gum from which the glyoxylated hydroxypropyl guar is reacted preferably has a molecular substitution of the hydroxyl groups of the guar gum ranging from about 0.05 to about 1.0, with the preferred degree of molecular substitution being between about 0.3 and 0.6.

With a liquid fertilizer composition thusly prepared according to the present invention, it is possible to obtain concentrations of potash as an available plant nutrient up to about 18% by weight, which as will be understood is considerably higher than possible in any conventionally available liquid fertilizer composition. Further, the protective colloidal effect of the glyoxylated hydroxypropyl guar is capable of supporting both a phosphorus-containing compound in a concentration by weight of less than approximately 3% together with elemental calcium in an unreacted state to be available as separate plant nutrients.

Another aspect of the present invention is the provision of a novel method of reacting guar gum with propylene oxide and the reaction product thereof with glyoxal in the absence of any solvent to produce glyoxylated hydroxypropyl guar. In known processes for the production of glyoxylated hydroxypropyl guar, such reactions are carried out in a water-solvent media wherein the solvent typically is an alcohol. While the use of such a reaction medium improves the efficiency of the reaction, the use of alcohol or another solvent significantly increases the overall cost of the process. In contrast, no alcohol or other solvent is required in performing the reaction process of the present invention, which basically involves the steps of first reacting a quantity of natural guar, i.e. the endosperm of seeds of the guar plant, preferably in the form of dehulled guar seed "splits", with a quantity of propylene oxide by charging such materials in an aqueous solution of an alkaline catalyst to produce a hydroxypropyl ether of guar gum as a reaction product and then reacting glyoxal with the reaction product by charging a quantity of glyoxal in the aqueous solution to produce glyoxylated hydroxypropyl guar as a reaction product.

According to the reaction method of this invention, the initial reaction of the guar seed endosperm with propylene oxide may be carried out under either superatmospheric or subatmospheric conditions, a pressurized superatmosphere of nitrogen being preferred in order to achieve an enhanced degree of molecular substitution of the hydroxyl groups of the guar seed endosperm. In either case, the aqueous solution is initially deaerated while being heated and is then cooled prior to charging the guar seed endosperm and the propylene oxide. Likewise, the reaction of the guar seed endosperm and the propylene oxide is carried out under heated conditions and subsequently cooled before charging the glyoxal. An acid such as common acetic acid is charged with the glyoxal for neutralizing the alkaline catalyst in the aqueous solution. It is additionally preferred that the glyoxylation of the hydroxypropyl guar from the first reaction be carried out in a subatmosphere.

DESCRIPTION OF THE PREFERRED EMBODIMENT

Figure 1:
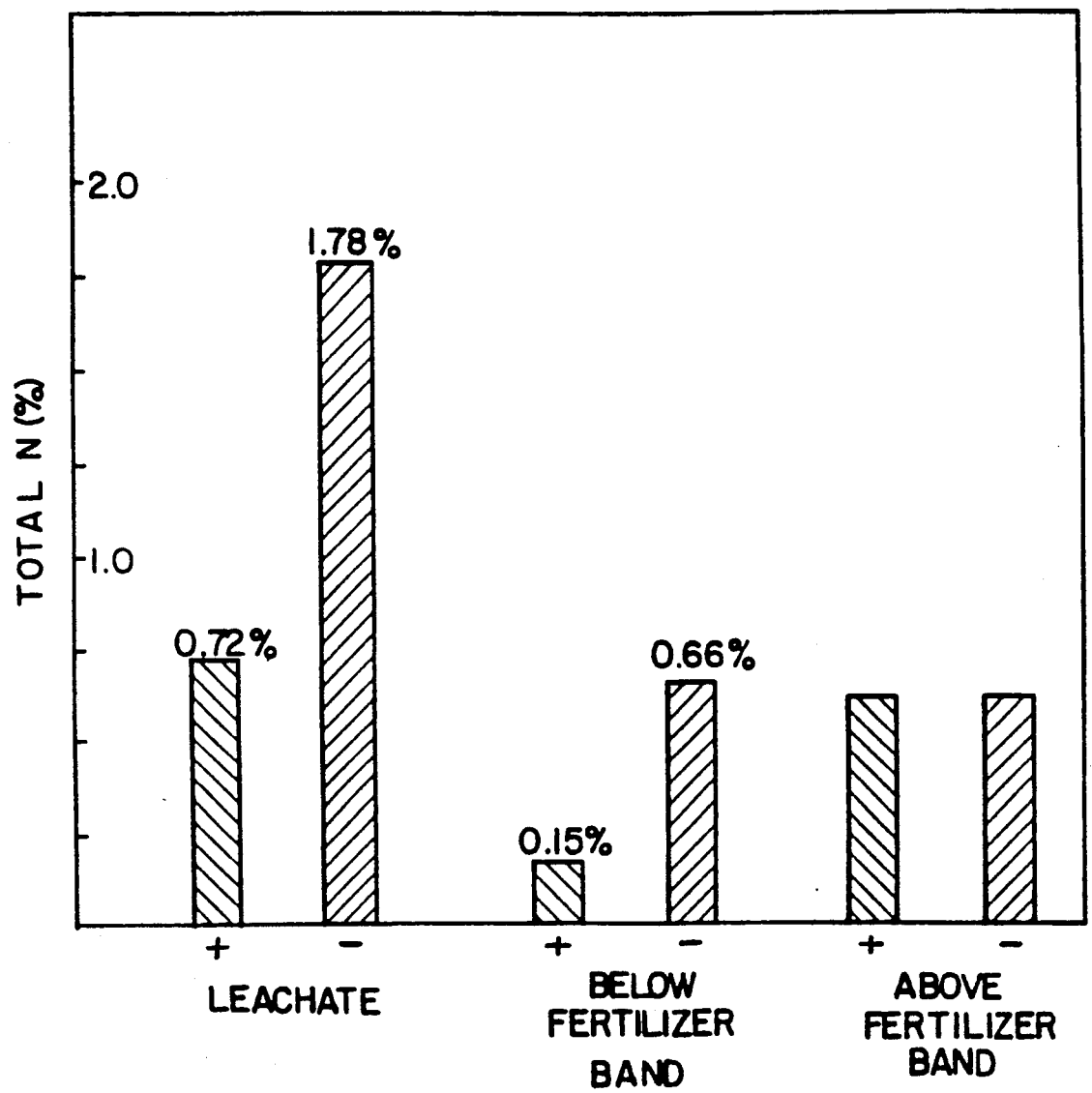
FIG. 1 is a bar graph illustrating results of a leaching test conducted to determine the effect of a subsoil application of a liquid fertilizer composition containing glyoxylated hydroxypropyl guar in accordance with the present invention on total nitrogen concentration in the leachate and in the soil above and below the fertilizer, in comparison to a corresponding subsoil application of the identical liquid fertilizer composition without glyoxylated hydroxypropyl guar dispersed therein.

As those persons skilled in the art will recognize from the foregoing, liquid fertilizer compositions and other liquid plant treatment compositions may be prepared in accordance with the present invention containing essentially any common plant nutrient or other plant treatment chemical in a wide variety of possible concentrations. Specifically, a full range of possible fertilizer compositions are contemplated having any of the usual fertilizer compounds containing any of the primary plant nutrients, nitrogen, phosphorus and potassium, either alone in a wide range of possible fertilizer grades, i.e. percentage concentration of available nutrient, or in combination in a wide range of possible nutrient concentration ratios. By way of example and without limitation, typical commercially available nitrogen-containing compounds which may be utilized are urea, ammonium nitrate, ammonium sulfate, ammonium phosphates, potassium nitrate and mixtures thereof. Possible phosphorus-containing fertilizer compounds are super phosphates and ammonium phosphates. Potassium salts are commonly utilized as potassium-bearing fertilizer compounds, such as potassium chloride, potassium sulfate, potassium nitrate, potassium phosphates, potassium carbonates, and potassium bicarbonates. In addition, micronutrients such as iron, manganese, copper, sulfur, calcium and the like may also be utilized in liquid fertilizer compositions of the present invention as necessary or desirable. Other plant treatment chemicals such as herbicides, insecticides, fungicides, fire retardants and the like may also be utilized.

Basically, such compositions according to the present invention are prepared by dispersing a quantity of glyoxylated hydroxypropyl guar in an aqueous mixture containing the desired plant treatment chemical or chemicals. As used herein, the term "aqueous mixture" is intended to include generically substantially any solution, suspension or other mixture in water of any one or more of the chemical compounds or like materials of the types described. As explained more fully herein, glyoxylated hydroxypropyl guar as utilized in this invention is in a particulate or power form. When added to such an aqueous mixture, the glyoxylated hydroxypropyl guar hydrates to thicken the aqueous mixture into a more viscous state so as to serve as a colloidal suspending agent to maintain the constituent chemical materials in mixture against any tendency to settle.

The proportion of the quantity of the glyoxylated hydroxypropyl guar to the total quantity of the aqueous mixture may be varied to provide the resultant composition with substantially any desired viscosity. Essentially, the viscosity of the liquid composition and, in turn, its ability to retard leaching increases as the concentration of the glyoxylated hydroxypropyl guar increases. Broadly, the concentration of glyoxylated hydroxypropyl guar by weight to the total weight of the mixture should be within the range from about 0.25% to about 10%. For fertilizer compositions, the glyoxylated hydroxypropyl guar should be dispersed in a concentration at the lower end of such range between about 0.25% and about 5.0% and, most preferably, from about 0.4% to about 1.5%. Within this range of concentrations, the glyoxylated hydroxypropyl guar is dispersed in a sufficient proportion to have a reasonable degree of affinity to hydrate additional water, e.g. rain water or irrigation water, to retard the rate of release of the constituent plant nutrients by water leaching, but not such a high affinity for retaining additional water by hydration to undesirably prolong the rate of nutrient leaching. Additionally, the viscosity of liquid fertilizer compositions within this range of glyoxylated hydroxypropyl guar concentrations are of a sufficiently low viscosity to still be readily pumped and sprayed utilizing conventional equipment for liquid fertilizer application. Liquid compositions containing herbicides, insecticides, fungicides, fire retardants and the like intended to be applied by spraying should similarly be prepared with glyoxylated hydroxypropyl guar in substantially the same range of concentrations as for liquid fertilizer compositions so as to be readily sprayable utilizing conventional application equipment while being sufficiently viscous to adhere to applied surfaces to resist washing therefrom. Other forms of such compositions intended to be applied in a manner other than spraying may be formulated with glyoxylated hydroxypropyl guar in more elevated concentrations up to about 10% by weight. For example, dispersion of glyoxylated hydroxypropyl guar in a liquid insecticide at a concentration of 1% to 10% by weight provides the composition with a paste-like consistency which may be applied in the same manner as caulking compounds about trees and other plants, along building foundations, and in any other desirable location to form a barrier to passage thereover of crawling insects.

As is known, glyoxylated hydroxypropyl guar is a reaction product of a hydroxypropyl ether of guar gum and glyoxal. According to the present invention, the hydroxypropyl ether of guar gum so reacted should have as high a degree of molecular substitution of the hydroxyl groups of the guar gum as is commercially and economically practical. As will be understood, the molecular structure of natural guar gum includes multiple anhydroglucose units averaging two mannose units and one galactose unit each, thereby providing three available hydroxyl groups per anhydroglucose unit available to react with propylene oxide to form hydroxypropyl guar. As such, the maximum possible degree of molecular substitution under ideal conditions is 3.0 but, of course, mass production of hydroxypropyl guar at such a high degree of molecular substitution is commercially and economically impractical. Broadly, any glyoxylated hydroxypropyl guar reacted from hydroxypropyl guar having a degree of molecular substitution exceeding about 0.05 will provide beneficial results under the present invention, a degree of molecular substitution within the range of about 0.3 to about 0.6 being preferred. The resistivity of the glyoxylated hydroxypropyl guar to bacterial attack and decomposition is generally enhanced as the degree of molecular substitution increases so as to provide better long term hydration, anti-leaching and anti-washing properties to the compositions of the present invention.

With the foregoing description of the present invention, it is believed that any person reasonably skilled in this art is hereby able to prepare and utilize glyoxylated hydroxypropyl guar-containing compositions to the fullest extent contemplated under the present invention. For purposes of illustration but without limiting the scope and substance of the present invention, the following examples describe several specific possible embodiments of fertilizer compositions in accordance with this invention.

EXAMPLE 1

A liquid fertilizer composition having the Grade 15-10-5, i.e. 15% nitrogen, 10% phosphorus, and 5% potassium as available plant nutrients by weight, is prepared by dispersing 20 pounds of glyoxylated hydroxypropyl guar powder into 366 pounds of a commercially available UAN (urea ammonium nitrate) liquid fertilizer solution of the Grade 32-0-0, after which an additional 366 pounds of the UAN, 270 pounds of a commercially available Grade 11-37-0 liquid fertilizer solution, 910 pounds of a commercially available Grade 4-11-11 liquid fertilizer solution and 88 pounds of water are added and uniformly mixed to the initially-formed dispersion.

EXAMPLE 2

A liquid fertilizer composition having the Grade 17-9-18 is prepared by initially dissolving 582 pounds of a commercially available solid potash fertilizer having the Grade 0-0-62 into 932 pounds of UAN 32-0-0 Grade liquid fertilizer, after which 20 pounds of powdered glyoxylated hydroxypropyl guar are dispersed in the solution and then 486 pounds of 11-37-0 liquid fertilizer solution are admixed. As will readily be noted by those persons skilled in the art, the 18% concentration of available potassium in this liquid fertilizer composition is substantially elevated over the maximum conventionally-possible concentration of available potassium which could heretofore be achieved in any commercially available liquid fertilizer solution or suspension, the glyoxylated hydroxypropyl guar of the present invention being effective as a suspension agent and protective colloid to maintain the excess potash in homogeneous suspension.

EXAMPLE 3

A liquid fertilizer composition having the Grade 16-20-0 may be prepared by dispersing 20 pounds of powdered glyoxylated hydroxypropyl guar into 314 pounds of UAN Grade 32-0-0 liquid fertilizer solution and then admixing an additional 314 pounds of the UAN solution, 1,082 pounds of Grade 11-37-0 liquid fertilizer solution and 290 pounds of water.

EXAMPLE 4

A liquid fertilizer composition having the Grade 21-7-3 may be prepared by initially dispersing 20 pounds of powdered glyoxylated hydroxypropyl guar in 585 pounds of UAN Grade 32-0-0 liquid fertilizer solution, followed by admixing an additional 585 pounds of the UAN solution, 216 pounds of Grade 11-37-0 liquid fertilizer solution, 546 pounds of Grade 4-11-11 liquid fertilizer solution, and 69 pounds of water.

EXAMPLE 5

A liquid fertilizer composition having the Grade 15.6-3-0 and including elemental calcium in a concentration of 5.5% by weight is prepared by mixing together 919 pounds of UAN Grade 32-0-0 liquid fertilizer solution and 919 pounds of a commercially available fertilizer having 12% calcium by weight, dispersing therein 20 pounds of powdered glyoxylated hydroxypropyl guar, and after thickening of this solution adding 162 pounds of Grade 11-37-0 liquid fertilizer solution. Importantly, in this liquid fertilizer composition, the glyoxylated hydroxypropyl guar acts as suspension agent and protective colloid to maintain the elemental calcium and the phosphorus-containing compound or compounds unreacted with one another which is not possible in conventional liquid fertilizer compositions. Indeed, without the use of glyoxylated hydroxypropyl guar, the calcium and available phosphorus would react to produce calcium phosphate, a solid insoluble salt. In order to prevent any undesired reaction of the calcium and phosphorus, it is important to maintain the concentration of available phosphorus in the resultant liquid fertilizer concentration less than approximately 3% by weight.

EXAMPLE 6

A liquid fertilizer composition of the Grade 32-0-0 containing fertilizer compounds having nitrogen as the only available plant nutrient may be prepared by dispersing 20 pounds of powdered glyoxylated hydroxypropyl guar in 1,000 pounds of UAN Grade 32-0-0 liquid fertilizer solution, and then admixing an additional 1,000 pounds of the UAN solution.

The graphs of the accompanying drawing figures illustrate the results of several tests conducted utilizing the fertilizer composition of Example 6 above, which demonstrate the significant ability of liquid fertilizer compositions according to the present invention to retard leaching of constituent plant nutrients. As will be understood by those persons skilled in the art, nitrogen-containing plant nutrient compounds are by far the most highly susceptible to leaching loss from soil and, accordingly, the fertilizer composition of Example 6 was utilized to best assess the benefits of the present invention.

In a first test represented by FIG. 1, two 24 inch tall tubular soil test columns, each covered by a fine mesh screen at its bottom end, were prepared by filling the lower 15 inches of each tube with pasture soil, placing a quantity of 10 cubic centimeters of the liquid fertilizer composition of Example 6 on the top surface of one 15 inch soil column, placing an identical quantity of UAN solution not containing any glyoxylated hydroxypropyl guar on the top surface of the other 15 inch soil column, and then filling each tube to within 3 inches of its top opening with an additional 6 inch depth of the pasture soil. A separate quantity of the pasture soil was set aside for testing of its basic nutrient contents. A total of 12 inches of water was then passed through each column by filling the 3 inch open depth of each column with water four consecutive times, and a container was placed beneath each column to collect the leachate therefrom. Each column was allowed to drain for a one week period, after which each column's leachate and soil, both above and below the fertilizer band, were analyzed for total nitrogen concentration. At the same time, the control sample of the soil utilized was also analyzed for total nitrogen concentration.

The leachate from the test column treated with ordinary UAN had a total nitrogen concentration of 1.78% and the 15 inch soil depth from such column below the fertilizer band had a total nitrogen concentration of 0.66%. In contrast, the leachate from the test column treated with the glyoxylated hydroxypropyl guar-containing liquid fertilizer composition of the present invention was found to have a total nitrogen concentration of 0.72%, i.e. only about 40% of the nitrogen content of the leachate from the other column. Likewise, the nitrogen concentration in the 15 inch soil depth below the fertilizer band in the test column treated with the fertilizer composition of the present invention was 0.15%, i.e. less than one/fifth the nitrogen content of the corresponding soil in the other column. The nitrogen content in the soil of each column above their respective fertilizer bands did not differ significantly. The tested nitrogen concentration of the untreated soil of the control sample in its natural state was 0.12%.

It will accordingly be readily recognized that a substantially lesser proportion of the available nitrogen was leached from the fertilizer containing glyoxylated hydroxypropyl guar than from the fertilizer having no guar, the soil beneath the present fertilizer composition in fact having a nitrogen content only 0.03% greater than the natural state of the unfertilized soil. Moreover, the total quantity of the leachate obtained from the soil column treated with the fertilizer composition of the present invention was substantially less than the leachate quantity obtained from the other soil column. Thus, this test clearly indicates that the glyoxylated hydroxypropyl guar dispersed in the fertilizer composition of the present invention serves to hydrate some proportion of additional water percolating therethrough and, in turn, retards leaching of its constituent plant nutrients by the percolating water to retain a greater plant nutrient content in the soil available for plant assimilation in comparison to a corresponding application of an identical fertilizer composition without glyoxylated hydroxypropyl guar.

Figure 2:
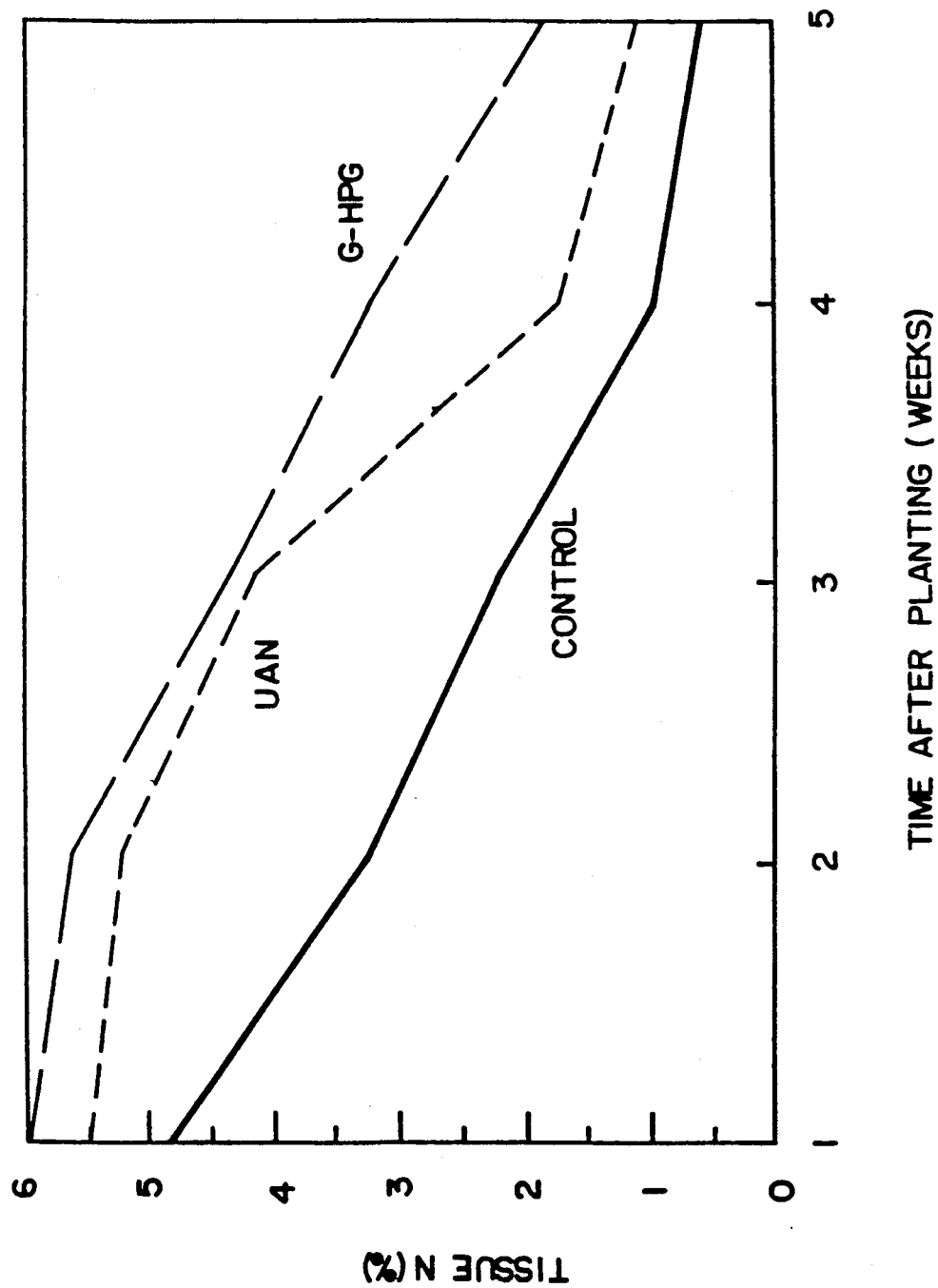
FIG. 2 is a graph plotting the results of a test conducted to determine the effect of an application of a liquid fertilizer composition contained glyoxylated hydroxypropyl guar according to the present invention on the total nitrogen concentration in the leaf tissue of plants growing in the treated soil as a function of the elapsed time in weeks after planting and fertilizer application, in comparison to other plants growing in soil correspondingly treated with the identical liquid fertilizer composition without any glyoxylated hydroxypropyl guar dispersed therein and plants growing in untreated soil.
Figure 3:
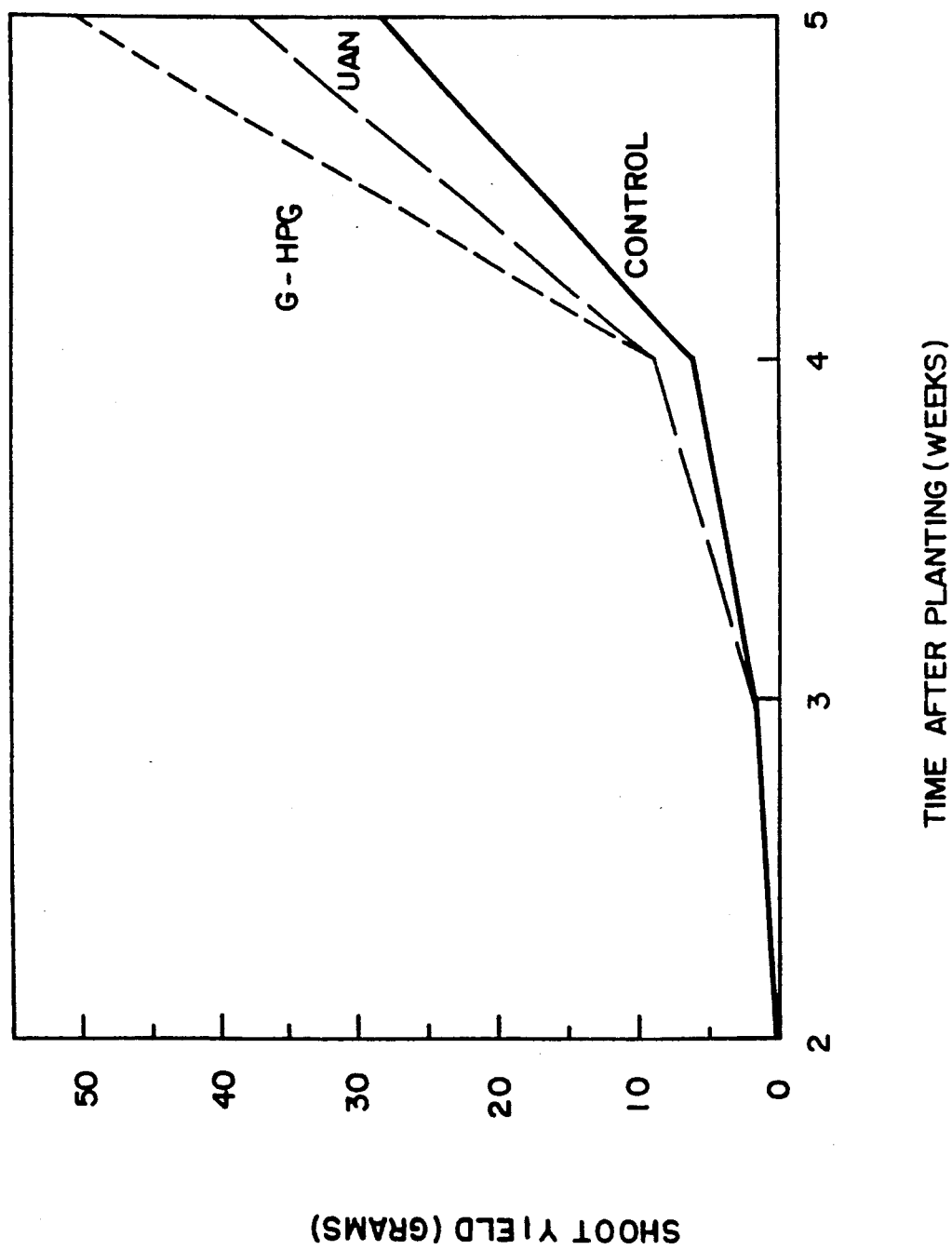
FIG. 3 is another graph plotting the shoot yield of the plants under the test of FIG. 2.

FIGS. 2 and 3 illustrate the results of a second test under which plants of a hybrid of sorghum and sudan grass were planted in soil treated at the time of planting with a quantity of the liquid fertilizer composition of Example 6, while for comparison purposes other plants of the same hybrid were grown in the same soil treated at the time of planting with the identical UAN fertilizer composition without any glyoxylated hydroxypropyl guar dispersed therein and a third control group of plants were grown in the same soil without any addition of a nitrogen bearing fertilizer.

The leaf tissue of each group of plants was analyzed weekly for the five weeks following planting to determine the total nitrogen content as a percentage by weight of the leaf tissue. As shown in FIG. 2, the tissue nitrogen concentration of the plants treated with the glyoxylated hydroxypropyl guar-containing fertilizer of the present invention had consistently higher nitrogen content over the entire duration of the test period than the plants fertilized with the UAN composition alone and, in turn, the latter plants had consistently higher nitrogen content than the unfertilized plants. At the end of the five week test period, the plants treated with the fertilizer composition of the present invention had in excess of a 70% greater nitrogen content than the plants fertilized with UAN alone. As will be understood by those persons skilled in the art, the protein content of the plants fertilized with the composition of the present invention is correspondingly greater than the protein content of the UAN-fertilized plants by a known factor of about 6.25.

During the same test period, the shoot yield in grams of the plants of each group was also measured. As depicted in FIG. 3, the plants fertilized with the glyoxylated hydroxypropyl guar-containing composition of the present invention experienced a substantial increase in shoot yield over the plants treated with UAN alone beginning at the fourth week of the test period. By the completion of the five week test, the plants fertilized with the composition of the present invention were 1.35 times heavier than the plants treated with UAN alone, representing a 34.6% greater yield.

The results of this test thus indicate that the glyoxylated hydroxypropyl guar utilized in the fertilizer composition of the present invention serves to supply to plants a greater quantity of the available nitrogen content of the fertilizer, enabling the plants to develop a greater nitrogen and protein content and grow more rapidly to a larger final size, than plants fertilized with the identical composition without glyoxylated hydroxypropyl guar dispersed therein.

To determine the ability of fertilizer compositions of the present invention to retard nutrient leaching under extremely poor conditions, tests were also conducted on the ability of a fertilizer composition of the present invention to retard nutrient leaching when utilized in very porous sandy soil and subjected to a large quantity of water percolation therethrough. For this purpose, soil test columns were prepared, each having a tube 6 inches in length and diameter closed at its bottom end with a fine mesh screen and filled to within 1 inch of the opposite upper tube end with lakeland sand. Five columns were prepared with a band of the liquid fertilizer composition of Example 6 above applied 1 inch beneath the soil surface in a quantity simulating the application of 100 pounds of nitrogen-bearing fertilizer per acre. A like number of columns were prepared in the same manner with a corresponding quantity of the identical basic UAN liquid fertilizer. Five control columns were likewise prepared without any added fertilizer. Each column was subjected to a leaching by percolation of water therethrough prior to any fertilizer application. One column of each group was then subjected to leaching immediately after fertilizer application. A second column of each group was leached one week after fertilizer application, a third column of each group was leached three weeks after fertilizer application, and a fourth column of each group was leached six weeks after fertilizer application. The remaining column of each group was leached weekly for six weeks, beginning one week after fertilizer application. Each leaching treatment was performed by passing 1,500 milliliters of water through the column being leached, to simulate the equivalent of 3.2 inches of applied water. A subsample of the leachate obtained from each leaching treatment was analyzed for nitrate ($NO_3$), ammonium ($NH_4$) and urea content as soon as free water drainage ceased. Following the final leaching of each test column, soil samples were also taken from the region of the fertilizer band and in 1 inch increments above and below the band, and the soil samples were analyzed colorimetrically for nitrate, ammonium and urea.

Figure 4A:
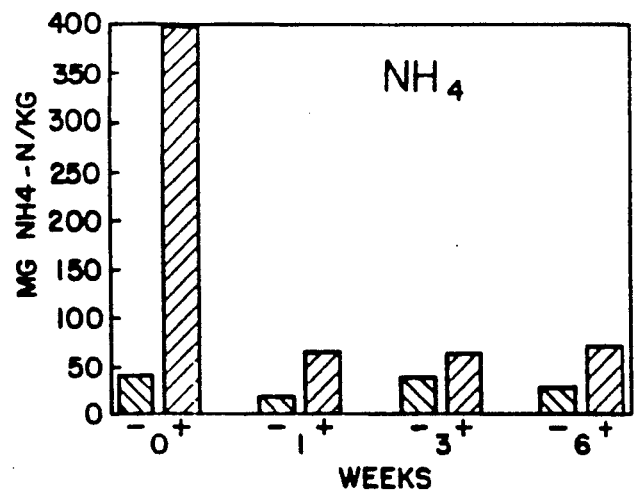
FIG. 4 is a series of bar graphs illustrating the results of a leaching test conducted to determine the effect of an application of a liquid fertilizer composition containing glyoxylated hydroxypropyl guar according to the present invention on the leachate concentration of nitrate ($NO_3$), ammonium ($NH_4$), and urea as a function of the duration of soil residence time of the fertilizer composition before leaching, in comparison to a corresponding application of the identical liquid fertilizer composition without glyoxylated hydroxypropyl guar dispersed therein.
Figure 4B:
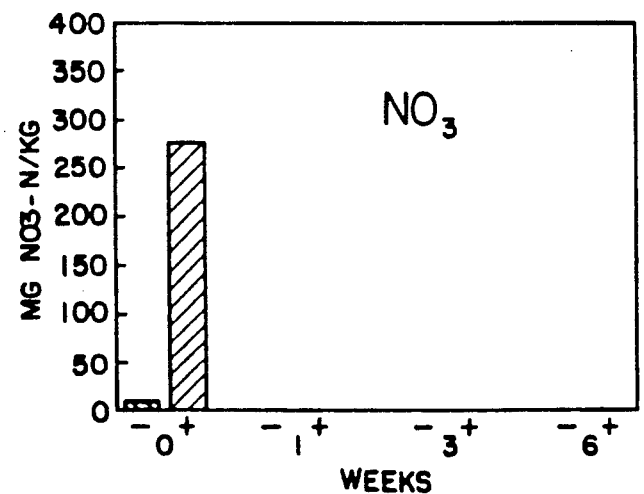
Figure 4C:
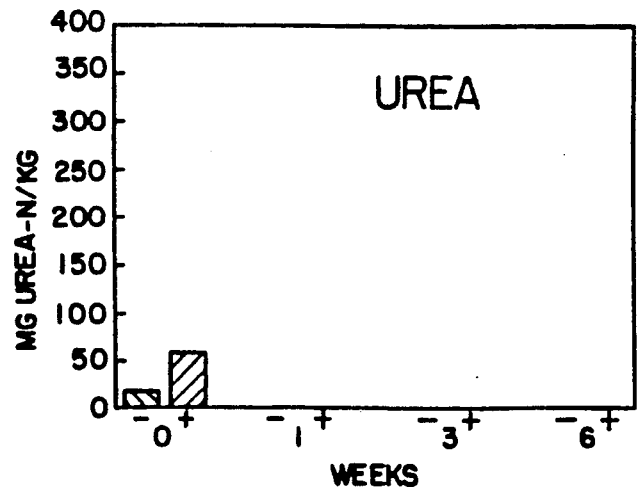
Figure 5A:
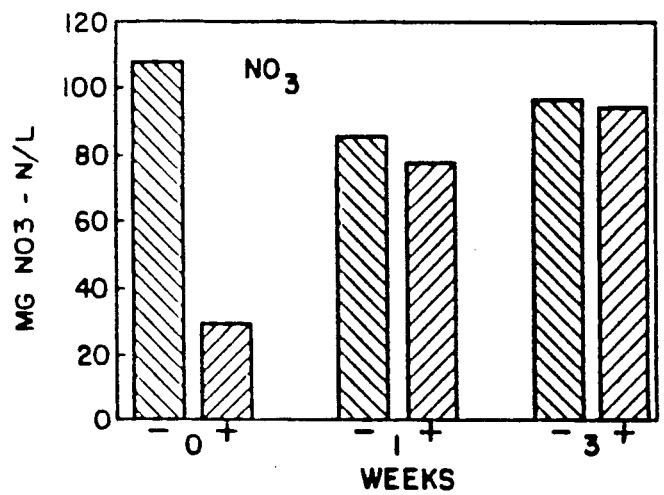
FIG. 5 is another series of bar graphs illustrating the results of a leaching test conducted to determine the results of an application of a liquid fertilizer composition containing glyoxylated hydroxypropyl guar according to the present invention on the concentrations of nitrate, ammonium, and urea in the soil area at which the fertilizer composition was applied as a function of the duration of the residence time of the fertilizer composition in the soil prior to leaching, in comparison with a corresponding application of the identical liquid fertilizer composition without glyoxylated hydroxypropyl guar dispersed therein.
Figure 5B:
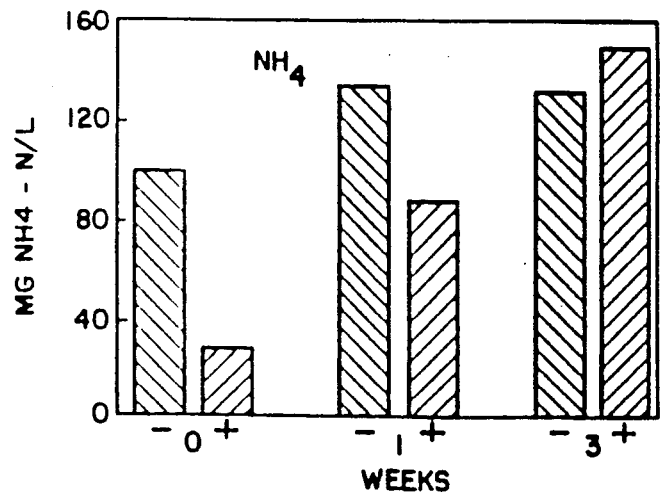
Figure 5C:
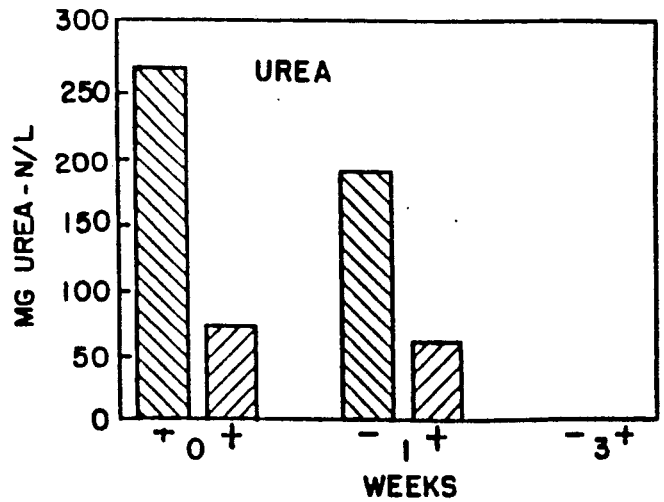

As illustrated in FIGS. 4 and 5, even under these extreme conditions, the fertilizer composition of the present invention having glyoxylated hydroxypropyl guar dispersed therein was effective in significantly reducing the leaching loss of each of nitrates, ammonium and urea as compared to common UAN fertilizer alone for somewhere between one and three weeks' duration following fertilizer application (FIG. 4) and in retaining more elevated concentrations of ammonium within the soil of the fertilizer band as compared to UAN fertilizer alone for the duration of the six week test while more elevated concentrations of nitrate and urea were maintained within the fertilizer band in comparison to UAN alone for less than one week after fertilizer application (FIG. 5).

More specifically, the bar graphs of FIG. 4 show that the leachate obtained from the first test column treated with the fertilizer composition of the present invention having glyoxylated hydroxypropyl guar dispersed therein had dramatically lower levels of nitrate, ammonium and urea than the first test column treated with UAN alone when each were leached immediately after fertilizer application. Significantly lower levels of nitrate, ammonium and urea were likewise present in the leachates from the second test columns wherein the respective fertilizer applications had resided unleached for one week prior to leaching treatment. However, when the third group of test columns were leached after a three week duration of residence of the fertilizer applications in the test columns, the differences in nitrogen leachate concentrations were not significant. Corresponding measurements were obtained from analysis of the leachates from the test columns which were leached weekly.

As shown in FIG. 5, analysis of the soil from the fertilizer band in the test columns leached immediately after fertilizer application revealed a remarkably higher content of ammonium, nitrate and urea in the soil sample taken from the test column treated with the glyoxylated hydroxypropyl guar-containing fertilizer as compared to the test column treated with UAN fertilizer alone. Likewise, the ammonium content in the fertilizer band samples taken from the test columns containing the liquid fertilizer composition of the present invention first leached one week, three weeks and six weeks, respectively, after fertilizer application was significantly higher in each case than the ammonium content of the fertilizer band samples taken from the corresponding test columns containing UAN fertilizer alone, although no significant levels of nitrate and urea were detected in the fertilizer bands of any of these test columns. No significant differences in urea, ammonium or nitrate content was found in the soil samples taken above and below the fertilizer bands in the test columns.

The results of these tests essentially demonstrate that several significant advantages may be obtained by utilizing fertilizer compositions prepared in accordance with the present invention. Specifically, application of a fertilizer composition of the present invention of any given grade of available plant nutrient concentrations will supply substantially higher quantities of nutrients to plants growing in the fertilized soil to enable the plants to grow more rapidly to a larger ultimate size and with a greater nitrogen and attendant protein content than a corresponding application of the same quantity of a conventional liquid fertilizer of the same grade, by virtue of the ability of the present fertilizer composition to hydrate and retain water percolating through the soil and, in turn, to retard leaching loss of the constituent plant nutrients in the fertilizer composition. As a result, substantially greater crop yields can be expected by use of the present fertilizer composition. As a corollary, crop yields comparable to currently conventional levels may be obtained by application of the present fertilizer composition in substantially reduced quantities as compared to the normal quantities in which conventional liquid fertilizer compositions are applied, enabling a significant reduction in fertilizer costs as an element of total crop cost. Further, the preparation of fertilizer compositions according to the present invention requires no specialized equipment and the present fertilizer compositions may readily be applied utilizing any conventional fertilizer spraying equipment. In contrast to conventional clay-suspension liquid fertilizer compositions, the fertilizer compositions according to the present invention are, as a result of their viscous nature, non-abrasive and in fact serve during use to lubricate the mechanical components of spraying equipment with which the composition comes into contact. Additionally, fertilizer compositions prepared according to the present invention may be expected to remain stable over extended periods of several months and even years, in significant contract to conventional fertilizer compositions.

As aforementioned, according to the only known process for reacting hydroxypropyl guar with glyoxal to produce glyoxylated hydroxypropyl guar as a reaction product, the reaction is carried out in a medium of water and alcohol or another solvent, which is a relatively costly process. According to another aspect of the present invention, a method is provided by which guar gum may be reacted with propylene oxide to produce hydroxypropyl guar as a reaction product and such reaction product may then be reacted with glyoxal all in the absence of alcohol or any other solvent. The basic parameters of different possible embodiments of this method are set forth above. By way of illustration but without limitation on the scope and substance of this basic reaction process, two specific examples of the process as may be carried out in a laboratory reactor are set forth below.

EXAMPLE 1

After normal preliminary cleaning, the reactor is closed and evacuated to create a subatmospheric condition within the reactor chamber, whereupon a quantity of 10 kilograms (22 pounds) of water and 320 grams (0.7 pounds) of 50% sodium hydroxide (NaOH) are charged into the reactor chamber from its holding tank and the reactor is then heated to deaerate the charged caustic aqueous solution. The chamber is cooled to approximately room temperature and 9.1 kilograms (20 pounds) of guar "splits", i.e. the dehulled endosperm of the seeds of the guar plant, are charged into the reaction chamber, followed by 2.5 kilograms (5.5 pounds) of propylene oxide. The chamber is pressurized, e.g. using an atmosphere of nitrogen gas, and, while maintaining this superatmospheric condition within the chamber, the chamber is heated to between 95° and 100° C., which temperature is maintained for approximately 1 hour and 45 minutes, after which the chamber is cooled to approximately room temperature. Through the foregoing steps of the process, the natural guar gum is reacted with the propylene oxide to produce hydroxypropyl guar as the reaction product, the performance of the reaction under pressurized conditions aiding in achieving an elevated degree of molecular substitution of the hydroxyl groups of the natural guar gum of between a 0.3 and 0.6 M.S.

After cooling of the reactor chamber, the reactor chamber is evacuated to a subatmospheric condition, following which the vacuum is released by a charge of nitrogen gas during which one and a half additional pounds of guar splits are charged. After again evacuating the chamber, a solution of 75 grams (0.165 pounds) of glyoxal and 385 grams (0.85 pounds) of acetic acid as a caustic neutralizing agent and catalyst dissolved in 0.91 kilograms (2 pounds) of water is charged into the chamber with the cooled hydroxypropyl guar. The subatmosphere is maintained in the chamber for approximately 30 minutes for substantially complete reaction of the glyoxal and the hydroxypropyl guar. Thereupon, the chamber vacuum is released and the reaction product, glyoxylated hydroxypropyl guar is discharged, dried and ground to a powder to pass a 60 mesh screen, U.S. Standard Sieve.

EXAMPLE 2

An aqueous solution of 10 kilograms (22 pounds) of water and 320 grams (0.7 pounds) of 50% sodium hydroxide is charged into an evacuated subatmospheric reactor chamber, which is then heated to deaerate the caustic solution. After cooling the chamber to approximately room temperature, the chamber is charged with 9.1 kilograms (20 pounds) of guar splits, followed by 2 kilograms (4.4 pounds) of propylene oxide. The chamber is evacuated and heated to between 90° and 100° C. and the temperature is maintained for approximately 1 hour 10 minutes, under which conditions the propylene oxide and the guar gum react with one another to produce a hydroxypropyl ether of guar gum. The reactor is then cooled to approximately room temperature and, while continuing to maintain the chamber vacuum, an aqueous solution of 75 grams (0.165 pounds) of glyoxal and 385 grams (0.85 pounds) of acetic acid dissolved in 0.91 kilograms (2 pounds) of water is charged into the chamber and reacted with the hydroxypropyl guar for approximately 30 minutes. Thereupon, the chamber vacuum is released, and the reaction product is discharged, dried and ground as in the above Example.

It will therefore be readily understood by those persons skilled in the art that the present invention is susceptible of a broad utility and application. Many embodiments and adaptations of the present invention other than those herein described, as well as many variation, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention.

The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A liquid fertilizer composition, characterized by an ability to retard leaching of constituent plant nutrients, comprising an aqueous solution containing a fertilizer chemical containing available plant nutrients and a dispersion in said solution of a reaction product of a hydroxypropyl ether of guar gum and glyoxal.

2. A liquid fertilizer composition according to claim 1 and characterized further in that said glyoxylated hydroxypropyl guar is dispersed in a sufficient proportion to said mixture to have an affinity to retain additional water by hydration.

3. A liquid fertilizer composition according to claim 1 and characterized further in that said glyoxylated hydroxypropyl guar is dispersed in a concentration of from about 0.25% to about 5.0% by weight of the total weight of said mixture.

4. A liquid fertilizer composition according to claim 3 and characterized further in that said glyoxylated hydroxypropyl guar is dispersed in a concentration of from about 0.4% to about 1.5% by weight of the total weight of said mixture.

5. A liquid fertilizer composition according to claim 1 and characterized further in that said hydroxypropyl ether of guar gum has a degree of molecular substitution of the hydroxyl groups of the guar gum of from about 0.05 to about 1.0.

6. A liquid fertilizer composition according to claim 1 and characterized further in that said hydroxypropyl ether of guar gum has a degree of molecular substitution of the hydroxyl groups of the guar gum of from about 0.3 to about 0.6.

7. A liquid fertilizer composition according to claim 1 and characterized further in that said fertilizer chemical comprises potash in a concentration by weight of from about 12% to about 18%.

8. A liquid fertilizer composition according to claim 1 and characterized further in that said fertilizer chemical comprises calcium and a compound containing available phosphorus unreacted with one another.

9. A liquid fertilizer composition according to claim 8 and characterized further in that said phosphorus containing compound is present in a concentration by weight of less than approximately 3%.

10. An aqueous-based liquid fertilizer composition, characterized by an ability to retard leaching of constituent plant nutrients and an affinity to retain additional water by hydration, comprising an aqueous mixture containing a fertilizer chemical containing available plant nutrients and a dispersion in said mixture of a reaction production of glyoxal and a hydroxypropyl ether of guar gum having a molecular substitution of its hydroxyl groups of from about 0.3 to 0.6, said glyoxylated hydroxypropyl guar being dispersed in a concentration of from about 0.4% to about 1.5% by weight of the total weight of said mixture.

11. A liquid fertilizer composition according to claim 10 and characterized further in that said fertilizer chemical comprises potash in a concentration by weight of from about 12% to about 18%.

12. A liquid fertilizer composition according to claim 10 and characterized further in that said fertilizer chemical comprises calcium and a compound containing available phosphorus unreacted with one another.

13. A liquid fertilizer composition according to claim 12 and characterized further in that said phosphorus containing compound is present in a concentration by weight of less than approximately 3%.

14. A method of reacting guar gum with propylene oxide and the reaction product thereof with glyoxal in the absence of any solvent to produce glyoxylated hydroxypropyl guar, comprising the steps of reacting a quantity of the endosperm of seeds of the guar plant with a quantity of propylene oxide by charging said guar seed endosperm and said propylene oxide in an aqueous solution of an alkaline catalyst to produce a hydroxypropyl ether of guar gum as a reaction product and then reacting glyoxal with said reaction product by charging a quantity of glyoxal in said aqueous solution to produce glyoxylated hydroxypropyl guar as a reaction product.

15. A method of reacting guar gum with propylene oxide and the reaction product thereof with glyoxal to produce glyoxylated hydroxypropyl guar according to claim 14 and characterized further by initially deaerating said aqueous solution before charging said guar seed endosperm and said propylene oxide.

16. A method of reacting guar gum with propylene oxide and the reaction product thereof with glyoxal to produce glyoxylated hydroxypropyl guar according to claim 15 and characterized further by heating said aqueous solution during said deaerating.

17. A method of reacting guar gum with propylene oxide and the reaction product thereof with glyoxal to produce glyoxylated hydroxypropyl guar according to claim 16 and characterized further by cooling said aqueous solution before charging said guar seed endosperm and said propylene oxide.

18. A method of reacting guar gum with propylene oxide and the reaction product thereof with glyoxal to produce glyoxylated hydroxypropyl guar according to claim 14 and characterized further by performing said reacting of said guar seed endosperm and said propylene oxide in a superatmosphere to achieve enhanced molecular substitution of the hydroxyl groups of the guar seed endosperm.

19. A method of reacting guar gum with propylene oxide and the reaction product thereof with glyoxal to produce glyoxylated hydroxypropyl guar according to claim 18 and characterized further in that said superatmosphere is a nitrogen atmosphere.

20. A method of reacting guar gum with propylene oxide and the reaction product thereof with glyoxal to produce glyoxylated hydroxypropyl guar according to claim 19 and characterized further by heating said aqueous solution, said guar seed endosperm and said propylene oxide during said reacting of said guar seed endosperm and said propylene oxide.

21. A method of reacting guar gum with propylene oxide and the reaction product thereof with glyoxal to produce glyoxylated hydroxypropyl guar according to claim 14 and characterized further by performing said reacting of said guar seed endosperm and said propylene oxide in a subatmosphere.

22. A method of reacting guar gum with propylene oxide and the reaction product thereof with glyoxal to produce glyoxylated hydroxypropyl guar according to claim 21 and characterized further by heating said aqueous solution, said guar seed endosperm and said propylene oxide during said reacting of said guar seed endosperm and said propylene oxide.

23. A method of reacting guar gum with propylene oxide and the reaction product thereof with glyoxal to produce glyoxylated hydroxypropyl guar according to claim 20 or 22 and characterized further by cooling said aqueous solution and said hydroxypropyl ether of guar gum before said charging said glyoxal.

24. A method of reacting guar gum with propylene oxide and the reaction product thereof with glyoxal to produce glyoxylated hydroxypropyl guar according to claim 14 and characterized further by charging an acid with said glyoxal for neutralizing said alkaline catalyst.

25. A method of reacting guar gum with propylene oxide and the reaction product thereof with glyoxal to produce glyoxylated hydroxypropyl guar according to claim 14 and characterized further by performing said reacting of said glyoxal and said hydroxypropyl ether of guar gum in a subatmosphere.

26. A liquid plant treatment composition, characterized by an ability to adhere to applied surfaces to resist washing therefrom, comprising an aqueous mixture containing a fertilizer and a dispersion in said mixture of a reaction product of a hydroxypropyl ether of guar gum and glyoxal.

27. A liquid plant treatment composition according to claim 1 and characterized further in that said glyoxylated hydroxypropyl guar is dispersed in a concentration of from about 0.25% to about 10.0% by weight of the total weight of said mixture.

28. A liquid plant treatment composition according to claim 1 and characterized further in that said hydroxypropyl ether of guar gum has a degree of molecular substitution of the hydroxyl groups of the guar gum of from about 0.05 to about 1.0.

29. A liquid plant treatment composition according to claim 28 and characterized further in that said hydroxypropyl ether of guar gum has a degree of molecular substitution of the hydroxyl groups of the guar gum of from about 0.3 to about 0.6.

* * * * *

UNITED STATES PATENT AND TRADEMARK OFFICE
CERTIFICATE OF CORRECTION

PATENT NO. : 5,104,436

DATED : April 14, 1992

INVENTOR(S) : Clifton H. Lauderdale, Vinai K. Srivastava, and Walter H. Carter It is certified that error appears in the above-identified patent and that said Letters Patent is hereby corrected as shown below:

Column 4, line 11, delete "concentration" and insert therefor -- concentrations --.

Column 13, line 24, delete "claim 3" and insert therefor -- claim 1 --.

Column 16, line 6, delete "claim 1" and insert therefor -- claim 26 --.

Column 16, line 11, delete "claim 1" and insert therefor -- claim 26 --.

Signed and Sealed this

Third Day of August, 1993

Attest:

MICHAEL K. KIRK

*Attesting Officer*    Acting Commissioner of Patents and Trademarks